US010285015B2

(12) United States Patent
Shirakata et al.

(10) Patent No.: US 10,285,015 B2
(45) Date of Patent: May 7, 2019

(54) LOCATION ESTIMATION SYSTEM, LOCATION ESTIMATION METHOD, AND BASE STATION CONTROL DEVICE (71) Applicant: Panasonic Intellectual Property Corporation of America, Torrance, CA (US)

(72) Inventors: Naganori Shirakata, Kanagawa (JP); Hiroshi Takahashi, Kanagawa (JP); Tomoya Urushihara, Kanagawa (JP); Junichi Morita, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/650,654

(22) Filed: Jul. 14, 2017

(65) Prior Publication Data
US 2018/0091947 A1 Mar. 29, 2018

(30) Foreign Application Priority Data

Sep. 28, 2016 (JP) .................................. 2016-189556

(51) Int. Cl.
*H04W 4/40* (2018.01)
*H04W 4/02* (2018.01)
(Continued)

(52) U.S. Cl.
CPC ........... *H04W 4/025* (2013.01); *G01S 5/0036* (2013.01); *G01S 5/0205* (2013.01); *G01S 5/0252* (2013.01);
(Continued)

(58) Field of Classification Search
CPC ..... G06K 7/0008; H01Q 1/1257; H04W 4/40; H04W 4/02
(Continued)

(56) References Cited

U.S. PATENT DOCUMENTS 7,136,624 B2 * 11/2006 Ofuji .................... H01Q 1/1257
455/63.4
7,667,572 B2 * 2/2010 Husak .................. G06K 7/0008
340/10.1

(Continued)

FOREIGN PATENT DOCUMENTS

JP 2004-112482 A 4/2004

OTHER PUBLICATIONS

The Extended European Search Report dated Feb. 23, 2018 for the related European Patent Application No. 17182288.5.

*Primary Examiner* — William D Cumming
(74) *Attorney, Agent, or Firm* — Seed IP Law Group LLP (57) ABSTRACT

A location estimation system for estimating a location of a wireless communication terminal, the location estimation system including first to M-th wireless communication devices and a control device, wherein i-th wireless communication device includes communication circuitry, which in operation, receives a signal transmitted from the wireless communication terminal using beams in Ni directions, and control circuitry, which in operation, calculates Ni reception qualities corresponding to the beams in the Ni directions, respectively, and wherein the control device includes control circuitry, which in operation, estimates i-th arrival direction of the signal received by the i-th wireless communication device by comparing the Ni reception qualities with the radiation angle characteristics of the beams in the Ni directions, and estimates the location of the wireless communication terminal based on the first to the M-th arrival directions estimated and locations of the first to the M-th wireless communication devices.

6 Claims, 4 Drawing Sheets

(51) Int. Cl.
*G01S 5/02* (2010.01)
*H04L 29/08* (2006.01)
*G01S 5/00* (2006.01)
*G01S 5/04* (2006.01)
*G01S 5/10* (2006.01)
*G01S 5/12* (2006.01)
*H04B 7/06* (2006.01)
*H04B 7/08* (2006.01)
*H04W 64/00* (2009.01)

(52) U.S. Cl.
CPC ............. *G01S 5/0284* (2013.01); *G01S 5/04* (2013.01); *G01S 5/10* (2013.01); *G01S 5/12* (2013.01); *H04B 7/0617* (2013.01); *H04B 7/0695* (2013.01); *H04B 7/086* (2013.01); *H04B 7/088* (2013.01); *H04L 67/18* (2013.01); *H04W 64/003* (2013.01); *H04W 64/006* (2013.01)

(58) Field of Classification Search
USPC ...................................... 455/25, 63.4, 456.5
See application file for complete search history.

(56) References Cited

U.S. PATENT DOCUMENTS

| | | | | |
|---|---|---|---|---|
| 7,667,575 | B2* | 2/2010 | Husak | G06K 7/0008 340/10.2 |
| 7,692,532 | B2* | 4/2010 | Fischer | G06K 7/0008 340/10.2 |
| 7,817,014 | B2* | 10/2010 | Krishna | G06K 7/0008 340/10.2 |
| 2003/0181163 | A1* | 9/2003 | Ofuji | H01Q 1/1257 455/25 |
| 2004/0127230 | A1 | 7/2004 | Bevan et al. | |
| 2006/0022800 | A1* | 2/2006 | Krishna | G06K 7/0008 340/10.2 |
| 2006/0022801 | A1* | 2/2006 | Husak | G06K 7/0008 340/10.5 |
| 2006/0022815 | A1* | 2/2006 | Fischer | G06K 7/0008 340/505 |
| 2006/0170565 | A1* | 8/2006 | Husak | G06K 7/0008 340/8.1 |
| 2008/0020785 | A1 | 1/2008 | Liu et al. | |
| 2018/0091947 | A1* | 3/2018 | Shirakata | H04W 4/025 |

* cited by examiner

LOCATION ESTIMATION SYSTEM, LOCATION ESTIMATION METHOD, AND BASE STATION CONTROL DEVICE

BACKGROUND

1. Technical Field

The present disclosure relates to a location estimation system, a location estimation method, and a base station control device, for estimating a location of a wireless communication terminal.

2. Description of the Related Art

Japanese Patent No. 3,829,784 discloses a location detection method for use in a system including a plurality of base station devices connected to a communication network, a wireless communication terminal operating as a mobile station wirelessly connected to the base station device, and an information server.

In the location detection method disclosed in Japanese Patent No. 3,829,784, a wireless communication terminal receives radio signals transmitted from respective base station devices and measures intensities of received signals. Further, based on respective intensities of received signals, the wireless communication terminal or the like having a function of the information server determines ranges in which this wireless communication terminal may be located (in other words, the distances between the wireless communication terminal and the respective base station devices), and estimate a location where the wireless communication terminal exists from an overlap of these ranges.

SUMMARY

In a wireless communication network using millimeter waveband (millimeter wave wireless communication network), a directivity control, in which beam patterns (for example, sectors) are switched, is performed between a wireless communication terminal and a base station device. In such a case, the antenna gain changes depending on the beam pattern of the base station device, and therefore, the intensity of received radio signal transmitted from each base station devices changes depending on the beam pattern.

However, the beam pattern of each base station device is unknown to the wireless communication terminal, and therefore, it is difficult to calculate a precise distance between the wireless communication terminal and the base station device based on the intensity of received signal as in the location detection method disclosed in Japanese Patent No. 3,829,784. As a result, it is difficult to perform a location estimation of the wireless communication terminal with a high degree of accuracy.

One non-limiting and exemplary embodiment in this disclosure provides a location estimation system that can improve the accuracy of location estimation of a wireless communication terminal in the millimeter wave wireless communication network.

In one general aspect, the techniques disclosed here feature a location estimation system for estimating a location of a wireless communication terminal, the location estimation system including first to M-th wireless communication devices and a control device, M being an integer equal to or more than two, wherein i-th wireless communication device, i being an integer between 1 to M, includes communication circuitry, which in operation, receives a signal transmitted from the wireless communication terminal using beams in Ni directions, Ni being an integer equal to or more than two, and control circuitry, which in operation, calculates Ni reception qualities corresponding to the beams in the Ni directions, respectively, and wherein the control device includes storage circuitry, which in operation, stores radiation angle characteristics of the beams in the Ni directions for each of the first to M-th wireless communication devices and control circuitry, which in operation, estimates i-th arrival direction of the signal received by the i-th wireless communication device by comparing the Ni reception qualities obtained from the i-th wireless communication device with the radiation angle characteristics of the beams in the Ni directions, and estimates the location of the wireless communication terminal based on the first to the M-th arrival directions estimated and locations of the first to the M-th wireless communication devices.

It should be noted that general or specific embodiments may be implemented as a system, a method, an integrated circuit, a computer program, a storage medium, or any selective combination thereof.

The embodiments in this disclosure enables the improvement of the accuracy of location estimation of a wireless communication terminal in a millimeter wave wireless communication network.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure will be described in detail with reference to the drawings. It should be note that the following embodiments are only examples, and the present disclosure should not be limited thereto.

Embodiments

Figure 1:
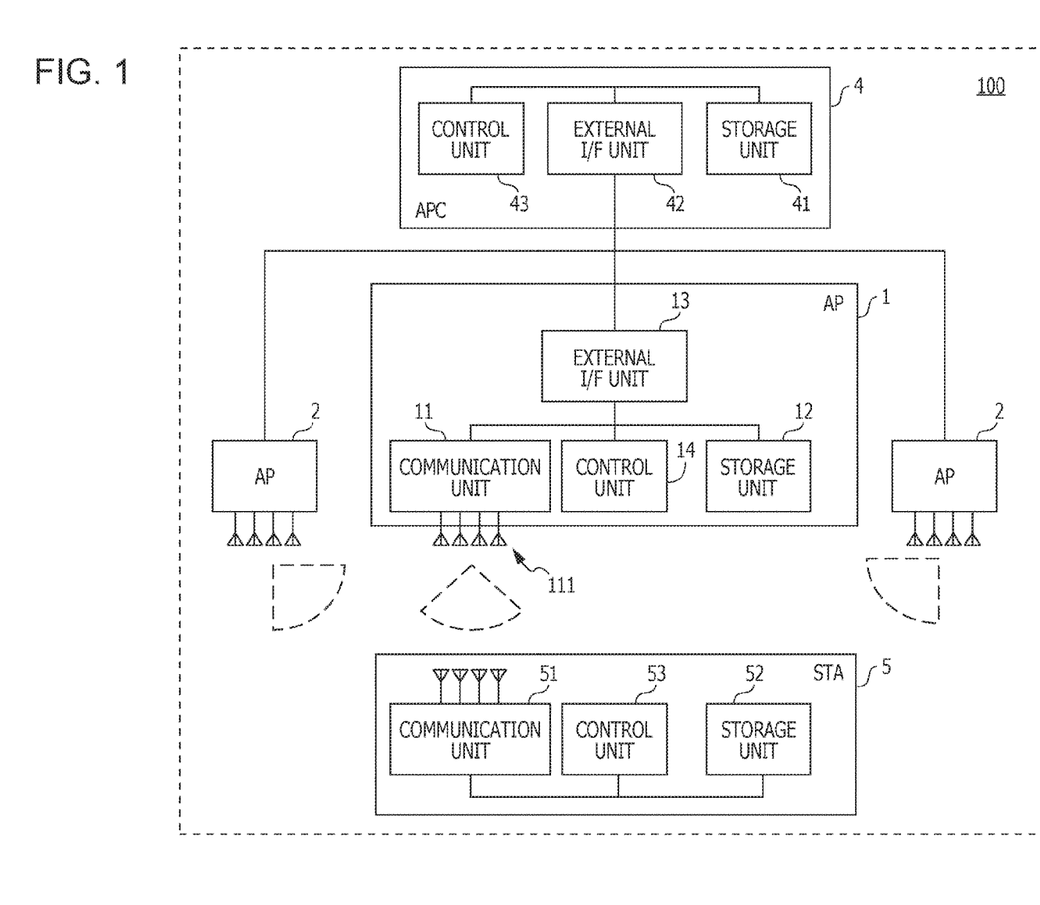
FIG. 1 is a diagram illustrating an example of configuration of a millimeter wave wireless communication system according to an embodiment in this disclosure.

FIG. 1 is a diagram illustrating an example of system configuration of a millimeter wave wireless communication system 100 according to the present embodiment. The millimeter wave wireless communication system 100 of FIG. 1 includes an access point (AP) 1, an AP 2, an AP 3, and an access point controller (APC) 4. Each AP corresponds to a wireless communication device in the present disclosure, and the APC 4 corresponds to a control device in the present disclosure. The millimeter wave wireless communication system 100 corresponds to a location estimation system that estimates a location of a station (STA) 5.

Each AP (AP 1 to AP 3) communicates with the STA 5 using millimeter waves. Each AP and the STA 5 transmit and receive data while performing a directivity control after connecting, establishing a link, and performing beam-forming training in accordance with IEEE802.11ad/WiGig protocol, for example. The ARC 4 controls a plurality of the APs (AP 1 to AP 3).

During the beam-forming training, each AP receives signals (for example, training packets) transmitted from the STA 5 while switching the beams, and calculates a reception quality associated with each beam. The ARC 4 estimates an angle of arrival of the signals received by each AP, based on the reception qualities obtained from each AP. Further, the ARC 4 estimates a location of the STA 5 based on the locations of respective APs and information on the angles of arrivals.

The beam-forming training performed between each AP and the STA 5, a process for estimating the angle of arrival performed by the APC 4 (hereinafter, referred to as "arrival direction estimation process"), and a process for estimating the location of the STA 5 performed by the ARC 4 (hereinafter, referred to as "location estimation process") will be described later.

The AP 1, the AP2, and the AP 3 have configurations similar to each other. Below, the configuration of the AP is described using the AP 1 as an example.

The AP 1 includes a communication unit 11, a storage unit 12, an external interface unit (external I/F unit) 13, and a control unit 14.

The communication unit 11 includes an array antenna 111 which is constituted by a plurality of antenna elements. The communication unit 11 performs directional communication using millimeter waves. The configuration of the array antenna 111 included in the communication unit 11 will be described later.

The storage unit 12 stores software for controlling the AP 1 and control data. The storage unit 12 stores data transmitted and received between the AP 1 and the STA 5, between the AP 1 and other APs (AP 2, AP3), and between the AP 1 and the ARC 4. Further, the storage unit 12 stores a log of the beam-forming training.

The external I/F unit 13 is, for example, an interface for establishing connection with the other APs (AP 2, AP3) and the APC 4 using Ethernet (Registered trademark), USB (Registered trademark) and the like.

The control unit 14 is consist of, for example, a central processing unit (CPU) that executes software stored in the storage unit 12, and the like. By controlling respective blocks of the AP 1 the control unit 14 performs a communication control including a beam-forming training control between the AP 1 and the STA 5, a communication control between the AP 1 and the other APs (AP 2, AP 3), a communication control between the AP 1 and the ARC 4, and the like.

The ARC 4 includes a storage unit 41, an external I/F unit 42, and a control unit 43.

The storage unit 41 stores software for controlling the ARC 4 and control data. The storage unit 41 stores data transmitted and received between the ARC 4 and the APs (AP 1 to AP3). Further, the storage unit 41 stores a log of beam-forming training performed by each AP, characteristics of an array antenna included in the communication unit of each AP, and information regarding orientation of the array antenna.

The external I/F unit 42 is, for example, an interface for connecting to each AP (AP 1 to AP3) using Ethernet, USB, and the like.

The control unit 43 is configured using, for example, a CPU that executes software stored in the storage unit 41. By controlling respective blocks of the APC 4, the control unit 43 performs a communication control between the ARC 4 and each AP, and the like.

The STA 5 includes a communication unit 51, a storage unit 52, and a control unit 53.

The communication unit 51 communicates with the communication unit of the AP (for example, the communication unit 11 of the AP 1) using millimeter waves. The communication unit 51 may not necessarily include an array antenna, and may not necessarily perform the directivity control.

The storage unit 52 stores software for controlling the STA 5 and control data. The storage unit 52 stores data transmitted and received between the STA 5 and each AP. Further, in a case where the communication unit 51 includes an array antenna and performs a directivity control, the storage unit 52 stores a log of beam-forming training.

The control unit 53 is consist of, for example, a CPU that executes software stored in the storage unit 52, and the like. By controlling respective blocks of the STA 5, the control unit 53 performs a communication control between the STA 5 and each AP, which includes a beam-forming training control and the like.

Next, the configuration of the array antenna 111 is described with reference to FIG. 2.

Figure 2:
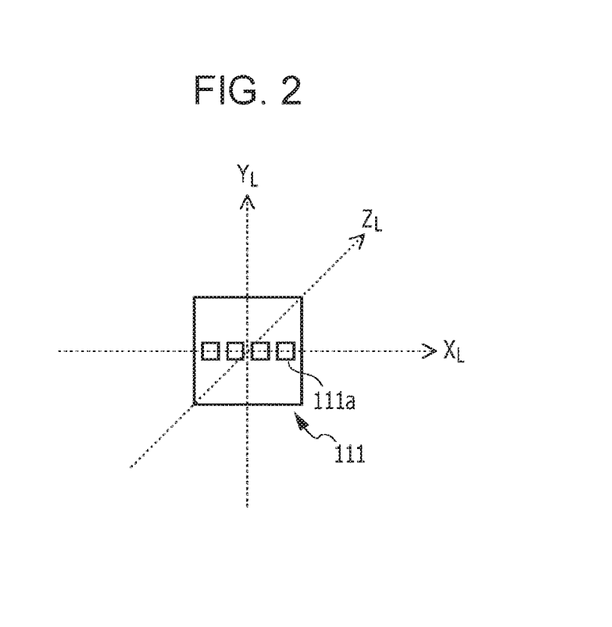
FIG. 2 is a diagram illustrating an example of configuration of an array antenna according to an embodiment in this disclosure.

FIG. 2 is a diagram illustrating an example of the configuration of the array antenna 111 according to the present embodiment. The array antenna 111 illustrated in FIG. 2 is a plane array antenna in which four rectangular antenna elements 111a are arranged linearly. Three-dimensional coordinate axes of $X_L$ axis, $Y_L$ axis, and $Z_L$ axis illustrated in FIG. 2 are coordinate axes representing a local coordinate system. These coordinate axes representing a local coordinate system are defined relative to the arrangement of the array antenna.

Specifically, a center of the array antenna 111 is defined as the origin of the local coordinate system. A linear direction along which the four antenna elements 111a are arranged is defined as the $X_L$ axis. A plane on which the array antenna 111 is arranged is defined as an $X_L$-$Y_L$ plane. Further, a direction to which radio waves are emitted from the array antenna 111 is defined as a positive direction of the $Z_L$ axis.

By setting appropriate phase differences among the antenna elements 111a, the array antenna 111 illustrated in FIG. 2 forms a radiation pattern having a directivity in an $X_L$-$Z_L$ plane of the defined local coordinate system.

For example, by preparing seven sets of phase differences to be set at the respective antenna elements 111a and switching the sets of phase differences, the array antenna 111 can direct a directional beam to seven directions, whose maximum radiation directions are different from each other. In the following, these seven directions of the directivity are referred to as "sectors". In other words, in this case, the array antenna 111 is a sector-switching antenna that switches the sectors from among seven sectors consisting of a sector 1 to a sector 7. Since the maximum radiation directions of respective sectors are different from each other, the radiation pattern of the array antenna 111 at each radiation angle becomes different depending on the sector.

It is described that the array antenna 111 of the AP 1 is a plane array antenna consisting of four rectangular antenna elements 111a. However, the number of the antenna elements and the shape of the array antenna are not limited thereto. All the array antennas of the communication units included in the APs may not necessarily have the same configuration. For example, the number of the antenna elements in the array antenna and/or the number of the sectors may be different in each AP.

Next, the radiation patterns of respective sectors in the array antenna 111 and an overview of the arrival direction estimation process are described with reference to FIG. 3.

Figure 3:
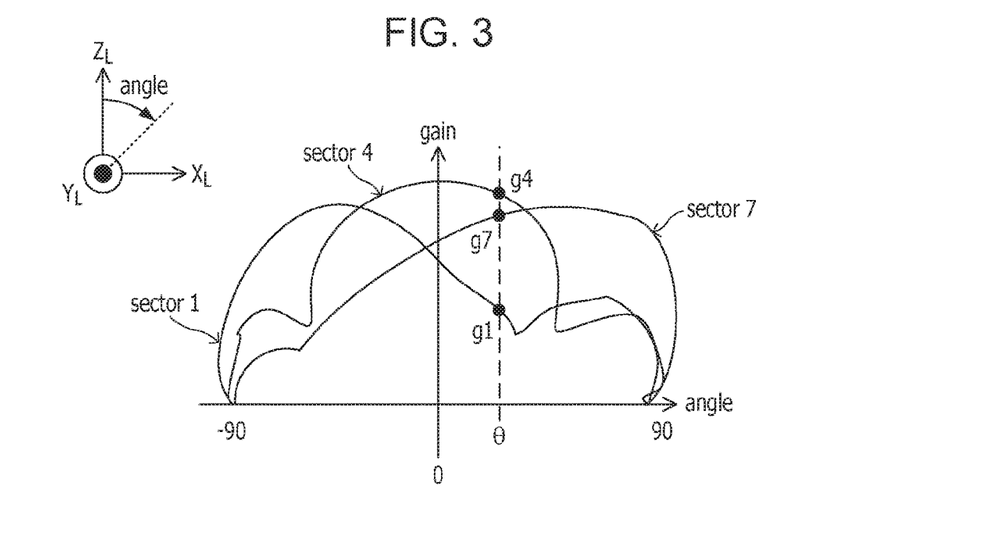
FIG. 3 is a diagram illustrating an example of radiation patterns of an array antenna according to an embodiment in this disclosure.

FIG. 3 is a diagram illustrating an example of the radiation patterns of the array antenna 111 in the present embodiment. The radiation patterns illustrated in FIG. 3 are antenna gains at respective radiation angles in the $X_L$-$Z_L$ plane of the local coordinate system. The vertical axis represents the antenna gain. The horizontal axis represents an angle from the positive direction of the $Z_L$ axis, where the positive direction of the $Z_L$ axis is assumed to be zero degree. Here, it is assumed that an angle formed with the positive direction of the Z axis is positive if the angle is a rotation in a direction from the positive direction of the $Z_L$ axis to the positive direction of the $X_L$ axis. FIG. 3 illustrates examples of the radiation patterns of the sector 1, the sector 4, and the sector 7, out of the seven sectors.

The sector 1 has the maximum gain at about −60-degree direction. The sector 4 has the maximum gain at about zero-degree direction (that is, a front direction). The sector 7 has the maximum gain at about 60-degree direction.

It should be noted that the shape of the radiation pattern changes depending on the shape of antenna board on which the array antenna is mounted, the path length of feed line for supplying electric power to the antenna elements, and the like. Thus, in general, the radiation pattern is not left-right symmetric. The control unit of each AP makes an adjustment by radiating or receiving a radio wave while changing an angle from sector to sector and measuring the antenna gain with respect to the azimuth angle.

FIG. 3 illustrates an antenna gain g1 at an angle θ in the radiation pattern of the sector 1, an antenna gain g4 at the angle θ in the radiation pattern of the sector 4, and an antenna gain g7 at the angle θ in the radiation pattern of the sector 7. The antenna gains at the angle θ satisfy a relationship of g4>g7>g1. Although it is not illustrated, the antenna gains in the radiation patterns of the sector 2, the sector 3, the sector 5, and the sector 6 at the angle θ are denoted by g2, g3, g5, and g6, respectively. Further, g4 is larger than g2, g3, g5, and g6.

In the beam-forming training, the AP 1 receives signals (for example, training packets) transmitted from the STA 5, which serves as a communication partner, while switching the sectors from the sector 1 to the sector 7, and searches the sector having the largest gain based on reception qualities calculated from the received signals. The reception quality is, for example, Received Signal Strength Indicator (RSSI), Signal to Noise Ratio (SNR), or Signal to Interference plus Noise Ratio (SINR).

Now, it is assumed that $r_1$ is the reception quality of a received signal when the AP 1 changes to the sector 1. Similarly, $r_2$ to $r_7$ are the reception qualities of received signals when the AP 1 changes to the sector 2 to the sector 7, respectively. The antenna gain and the reception quality bear a proportional relationship. Therefore, for example, in a case where the STA 5 is located in a direction of the angle θ with respect to the array antenna 111, $r_4$ becomes the best reception quality. By comparing the reception qualities $r_1$ to $r_7$ of the received signals, the AP 1 selects the sector 4 that corresponds to the reception quality $r_4$.

Here, it is assumed that a reception quality vector ($r_1$, $r_2$, $r_7$) represents a set of the reception qualities $r_1$ to $r_7$ of the received signals. It is also assumed that a radiation pattern vector (g1(θ), g2(θ), g7(θ)) represents a set of the radiation patterns. Each element of the radiation pattern vector corresponds to each one of the seven sectors, and is a function of angle θ. The radiation patterns of the seven sectors are stored as characteristics of the array antenna in the storage unit 41 of the ARC 4, for example.

As described above, since the antenna gain and the reception quality bear a proportional relationship, a comparison is performed by using pattern matching between the reception quality vector and the radiation pattern vector, and the angle θ having the highest similarity between the reception quality vector and the radiation pattern vector is calculated.

The target subject to be used in the pattern matching with the reception quality vector is not limited to the radiation pattern vector if the target subject is information indicating characteristics by the radiation angle of the sectors of the array antenna of each AP. For example, in place of the radiation pattern vector, an arrival direction model (m1(θ), m2(θ), . . . ) associated with the angle of arrival θ may also be used. The arrival direction model may be, for example, a model formulated by performing machine learning of a plurality of measurement results.

Next, a flow of the beam-forming training is described with reference to FIG. 4.

Figure 4:
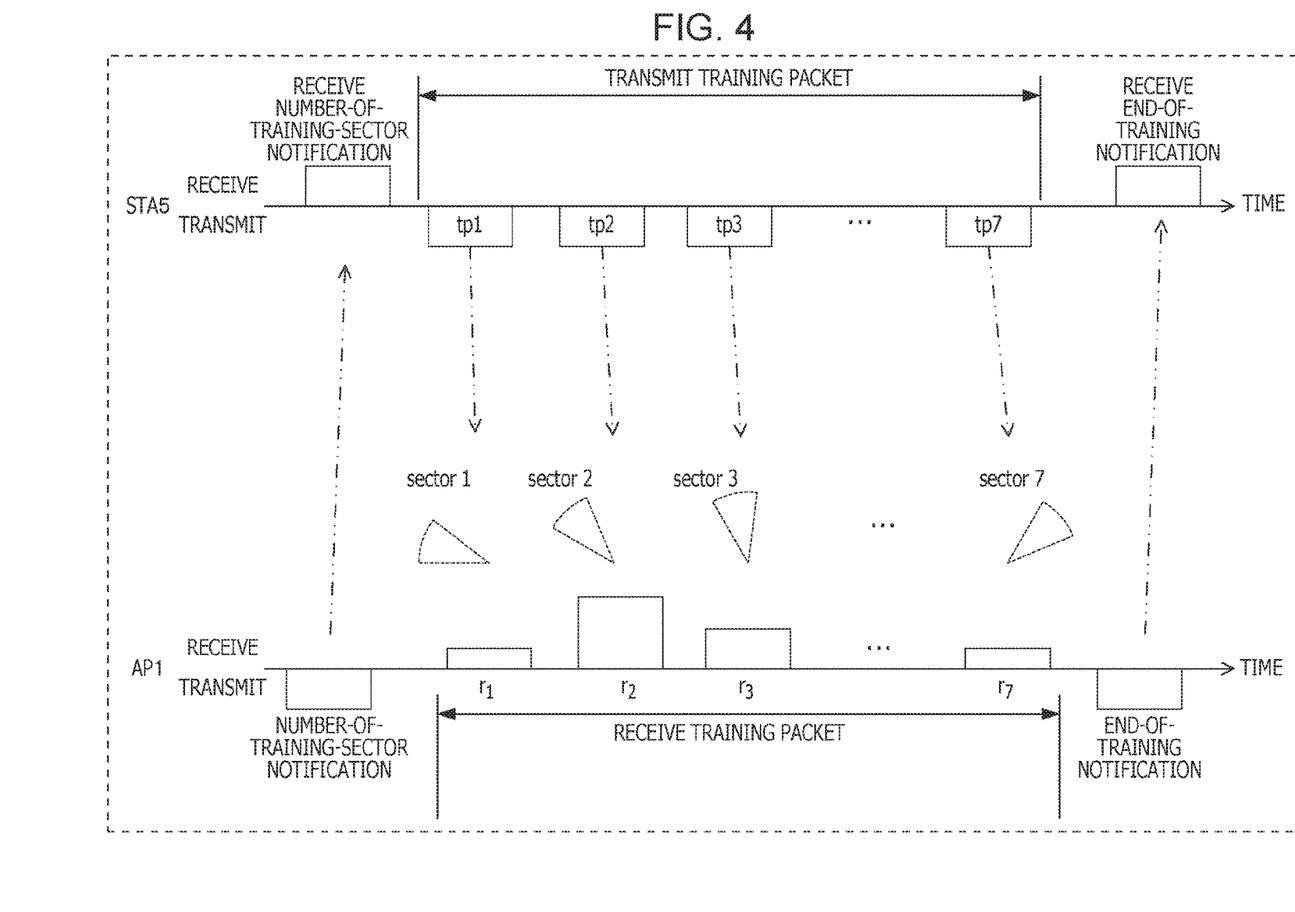
FIG. 4 is a diagram illustrating an example of timing chart for beam-forming training according to an embodiment in this disclosure.

FIG. 4 is a diagram illustrating an example of timing chart for the beam-forming training in the present embodiment. The beam-forming training illustrated in FIG. 4 is an example of beam-forming training to be performed between the AP 1 and the STA 5. The STA 5 also performs similar beam-forming training with the other APs (for example, AP 2, AP 3).

The horizontal axis of FIG. 4 represents the time. On the upper side of FIG. 4, packets transmitted by the STA 5 and packets received by the STA 5 are illustrated. On the lower side of FIG. 4, packets transmitted by the AP 1 and packets received by the AP 1 are illustrated.

First, the AP 1 transmits, to the STA 5, a packet to give notice of the number of sectors needed for beam-forming training. The number of sectors needed for beam-forming training may be the same as the number of the sectors between which the AP 1 can switch or may be different therefrom.

After receiving the notice of the number of sectors needed for beam-forming training, the STA 5 transmits the same number of training packets as the number of sectors indicated in the notice at predetermined time intervals. The AP 1 receives the training packets transmitted from the STA 5 while switching the sectors.

For example, in a case where the AP 1 includes the array antenna that switches seven sectors and notifies the STA 5 that the number of sectors needed for beam-forming training is 7, the STA 5 transmits seven training packets (tp1 to tp7) as illustrated in FIG. 4. The AP 1 switches to the sector 1 during a reception period of the training packet tp1 and receives the training packet tp1. Similarly, the AP 1 switches to the sector 2 during a reception period of the training packet tp2 and receives the training packet tp2. The AP 1 sequentially switches the seven sectors from the sector 1 to the sector 7 and receives seven training packets.

Further, after finishing reception of the seven training packets, the AP 1 transmits a packet to the STA 5 to give notice of an end of beam-forming training.

The control unit 14 of the AP 1 calculates reception qualities of the training packets tp1 to tp7 received via the communication unit 11.

As illustrated in FIG. 4, it is assumed that $r_1$ is the reception quality of the training packet tp1 received when the AP 1 switches to the sector 1. Similarly, it is assumed that $r_2$ to $r_7$ are the reception qualities of the training packets tp2 to tp7 received when the AP 1 switches to the sector 2 to the sector 7, respectively. As illustrated in Equation (1), the AP 1 compares the reception qualities $r_1$ to $r_7$ and selects a sector (best sector) corresponding to the best reception quality.

$$\text{best\_sector} = \operatorname*{argmax}_{n}(r_n), \{n = 1, \ldots, 7\} \qquad \text{Equation (1)}$$

In FIG. 4, because the reception quality $r_2$ indicates the best value, the control unit 14 of the AP 1 selects the sector 2. After the beam-forming training, the AP 1 switches to the sector 2 and receives packets of data and the like from the STA 5.

In the beam-forming training, the AP 1 can obtain the reception qualities $r_1$ to $r_7$ of the respective sectors for the training packets transmitted by the STA 5. The control unit 14 of the AP 1 transmits a reception quality vector representing a set of the reception qualities $r_1$ to $r_7$ of the respective sectors to the ARC 4 via the external I/F unit 13. Similarly, the other APs also transmit reception quality vectors to the ARC 4. Further, based on the reception quality vector obtained from each AP, the ARC 4 estimates an arrival direction of the training packets transmitted by the STA 5, that is, a direction in which the STA 5 is present. Further, based on the estimated arrival directions, the ARC 4 estimates a location of the STA 5.

Alternatively, each AP may notify the STA 5 of a transmission request of a signal at timing different from the beam-forming training and perform a process of calculating the reception quality of each sector for the signal transmitted by the STA 5.

Next, the arrival direction estimation process performed by the ARC 4 is described.

The control unit 43 of the APC 4 obtains the reception quality vector from each AP via the external I/F unit 42. Further, the control unit 43 compares the radiation pattern vector of each AP stored in the storage unit 41 with the obtained reception quality vector. Specifically, the control unit 43 performs pattern matching between the radiation pattern vector and the reception quality vector while changing θ of the radiation pattern vector, where the radiation pattern vector is a function of the angle θ. Further, the control unit 43 estimates, as the angle of arrival, the angle θ corresponding to the radiation pattern vector that is found to be the most similar to the reception quality vector as a result of the pattern matching.

For example, as a method of the pattern matching, identification or regression or the like by K-Nearest Neighbor algorithm that obtains the shortest Euclidean distance between vectors or Support Vector Machine (SVM) algorithm may be used. Alternatively, for example, identification or regression or the like by decision tree or Random Forest method may be used. Further, identification or regression or the like by Neural Network algorithm may also be used. A plurality of algorithms may be combined as well.

The control unit 43 calculates the angle at which the radiation pattern vector of the AP 1 becomes the most similar to the reception quality vector obtained from the AP 1 as an angle of arrival $\theta_1$ in the local coordinate system of the array antenna 111 of the AP 1. Similarly, the control unit 43 calculates the angle at which the radiation pattern vector of the AP 2 becomes the most similar to the reception quality vector obtained from the AP 2 as an angle of arrival $\theta_2$ in the local coordinate system of the array antenna of the AP 2.

Next, the control unit 43 sets up an arrival direction vector relating to the estimated angle of arrival. Because the angle of arrival is an angle in the $X_L$-$Z_L$ plane, an arrival direction vector $AoA_1$ for the angle of arrival $\theta_1$ and an arrival direction vector $AoA_2$ for the angle of arrival $\theta_2$ are each expressed by Equation (2) using homogeneous coordinate expression.

$$AoA_1 = (\cos\theta_1, 0, \sin\theta_1, 1)^T$$

$$AoA_2 = (\cos\theta_2, 0, \sin\theta_2, 1)^T \qquad \text{Equation (2)}$$

The arrival direction vector $AoA_1$ of Equation (2) is expressed as a unit vector having a unit size in the local coordinate system of the AP 1. The arrival direction vector $AoA_2$ of Equation (2) is expressed as a unit vector having a unit size in the local coordinate system of the AP 2. In other words, the arrival direction vector $AoA_1$ and the arrival direction vector $AoA_2$ are defined in different local coordinate systems, respectively.

Next, an example of the location estimation process based on the estimated arrival direction vectors is described with reference to FIG. 5. The location estimation process to be described below is a process for estimating the location of the STA 5 from the arrival direction vectors of two APs (AP 1 and AP 2).

Figure 5:
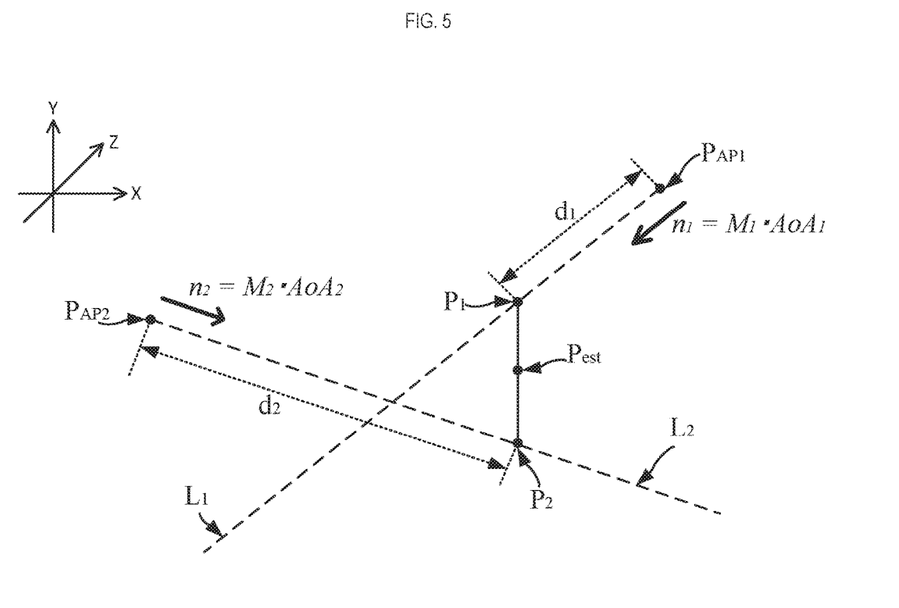
FIG. 5 is a diagram illustrating an example of location estimation according to an embodiment in this disclosure.

FIG. 5 is a diagram illustrating an example of the location estimation according to the present embodiment. In FIG. 5, a location of the AP 1 (point $P_{AP1} = (x_1, y_1, z_1, 0)$), a location of the AP 2 (point $P_{AP2} = (x_2, y_2, z_2, 0)$), and an estimated location of the STA 5 (point $P_{est}$) in a world coordinate system represented by X axis, Y axis, and Z axis are illustrated. $n_1$ illustrated in FIG. 5 is a direction vector calculated from the orientation of the array antenna of the AP 1 and the arrival direction vector $AoA_1$ $n_2$ is a direction vector calculated from the orientation of the array antenna of the AP 2 and the arrival direction vector $AoA_2$.

In FIG. 5, a line $L_1$ and a line $L_2$ are also illustrated. The line $L_1$ is a line that passes the point $P_{AP1}$ and is parallel to the direction vector $n_1$, and the line $L_2$ is a line that passes the point $P_{AP2}$ and is parallel to the direction vector $n_2$. A point $P_1$ is a closest point to the line $L_2$ among points on the line $L_1$. A point $P_2$ is a closest point to the line $L_1$ among points on the line $L_2$. A distance $d_1$ illustrated in FIG. 5 is a distance between the point $P_{AP1}$ and the point $P_1$, and a distance $d_2$ is a distance between the point $P_{AP2}$ and the point $P_2$.

In the location estimation process, the control unit 43 of the APC 4 performs calculation of the direction vector $n_1$ and the direction vector $n_2$ and calculation of the point $P_1$ and the point $P_2$, and calculates a center point of a line segment $P_1P_2$ as the estimated location $P_{est}$ of the STA 5.

The direction vector n is a composite vector of an orientation transformation matrix $M_1$, which corresponds to the orientation of the array antenna 111 of the AP 1, and the arrival direction vector $AoA_1$. To transform the arrival direction vector $AoA_1$ represented in the local coordinate system of the array antenna 111 of the AP 1 to the world coordinate system, the control unit 43 performs an operation of the arrival direction vector $AoA_1$ and the orientation transformation matrix $M_1$ of the array antenna 111, which is expressed using Euler angles (r, p, h). The orientation transformation matrix of the array antenna of each AP is stored in the storage unit 41 of the APC 4 in advance.

For example, the orientation transformation matrix M based on Euler transformation E (r, p, h) is expressed as Equation (3) where r is an angle of rotation about the Z axis, p is an angle of rotation about the X axis, and h is an angle of rotation about the Y axis in the world coordinate system.

$$M = E(h, p, r) = R_y(h)R_x(p)R_z(r) \quad \text{Equation (3)}$$

$$= \begin{pmatrix} \cos(h) & 0 & \sin(h) & 0 \\ 0 & 1 & 0 & 0 \\ -\sin(h) & 0 & \cos(h) & 0 \\ 0 & 0 & 0 & 1 \end{pmatrix} \begin{pmatrix} 1 & 0 & 0 & 0 \\ 0 & \cos(p) & -\sin(p) & 0 \\ 0 & \sin(p) & \cos(p) & 0 \\ 0 & 0 & 0 & 1 \end{pmatrix}$$

$$\begin{pmatrix} \cos(r) & -\sin(r) & 0 & 0 \\ \sin(r) & \cos(r) & 0 & 0 \\ 0 & 0 & 1 & 0 \\ 0 & 0 & 0 & 1 \end{pmatrix}$$

In other words, the direction vector $n_1$ is calculated by Equation (4) using the orientation transformation matrix $M_1$, which corresponds to the orientation of the array antenna of the AP 1, and the arrival direction vector $AoA_1$.

$$n_1 = M_1 AoA_1 \quad \text{Equation (4)}$$
$$= R_y(h_1)R_x(p_1)R_z(r_1)AoA_1$$

Similarly, the direction vector $n_2$ is calculated by Equation (5) using an orientation transformation matrix $M_2$, which corresponds to the orientation of the array antenna of the AP 2, and the arrival direction vector $AoA_2$.

$$n_2 = M_2 AoA_2 \quad \text{Equation (5)}$$
$$= R_y(h_2)R_x(p_2)R_z(r_2)AoA_2$$

Next, the control unit 43 calculates the point $P_1$ and the point $P_2$. The line segment $P_1P_2$ connecting the point $P_1$ and the point $P_2$ is orthogonal to both the line $L_1$ and the line $L_2$. Thus, for the point $P_1$ and the point $P_2$, Equation (6) holds.

$$n_1 \cdot (P_2 - P_1) = 0$$
$$n_2 \cdot (P_2 - P_1) = 0 \quad \text{Equation (6)}$$

Here, "·" denotes a dot product operation of vectors.

Further, the distance $d_1$ is a distance between the point $P_{AP1}$ and the point $P_1$, and the distance $d_2$ is a distance between the point $P_{AP2}$ and the point $P_2$. Thus, for the point $P_1$ and the point $P_2$, Equation (7) holds.

$$P_1 = P_{AP1} + d_1 * n_1$$
$$P_2 = P_{AP2} + d_2 * n_2 \quad \text{Equation (7)}$$

Here, "*" denotes a scalar multiplication operation. For example, $d_1 * n_1$ means multiplying the direction vector $n_1$ by $d_1$ times.

The control unit 43 calculates the distance $d_1$ and the distance $d_2$ using Equation (8), which is based on Equation (6) and Equation (7).

$$d_1 = \frac{n_1 \cdot P_{A21} - n_{ip} * (n_2 \cdot P_{A21})}{1 - n_{ip} * n_{ip}} \quad \text{Equation (8)}$$

$$d_2 = \frac{n_{ip} * (n_1 \cdot P_{A21}) - n_2 \cdot P_{A21}}{1 - n_{ip} * n_{ip}}$$

Here, $P_{A21} = P_{AP2} P_{AP1}$, and $n_{ip} = n_1 \cdot n_2$. In other words, $n_{ip}$ is scalar.

The control unit 43 calculates the point $P_1$ and the point $P_2$ using the calculated distance $d_1$ and distance $d_2$, and Equation (7). Further, the control unit 43 calculates the estimated location (point $P_{est}$) of the STA 5 using Equation (9).

$$P_{est} = \frac{P_1 + P_2}{2} \quad \text{Equation (9)}$$

In a case where the direction vector $n_1$ is parallel to the direction vector $n_2$, it is difficult for the control unit 43 to calculate the point $P_1$ and the point $P_2$. In such case, the control unit 43 calculates a plurality of points $P_{est}$ based on the reception quality vectors respectively obtained from a plurality of combinations of APs, for example, a combination of the AP 1 and the AP 3 and a combination of the AP 2 and the AP 3. The control unit 43 may determine a center point or a point of gravity center or the like of the plurality of points $P_{est}$ as the estimated location of the STA 5. In this case, if a length of the line segment $P_1P_2$ is longer than a predetermined threshold in a combination of the APs, the control unit 43 determines that an error is large and excludes such combination of the APs from the plurality of points $P_{est}$ when calculating the estimated locations.

In a case where a known obstacle (for example, floor, ceiling) exists in space where the APs are installed, the control unit 43 may perform the estimation by limiting to an area where the known obstacle is excluded. Information regarding a location of the known obstacle may be stored in the storage unit 42 in advance.

For example, if it is indicated that the calculated point $P_{est}$ is below a floor, the control unit 43 may limit or compensate the result in such a way that an actual estimated location of the STA 5 is on or above the floor.

As described above, in the present embodiment, each AP receives signals transmitted from the STA 5 while switching the sectors (beams) and calculates the reception qualities of the respective sectors. Further, the APC 4 obtains the reception qualities of the respective sectors from each AP and estimates the arrival direction by comparing the obtained reception qualities with the characteristics by the radiation angle of the sectors. Further, based on the estimated arrival directions, the ARC 4 estimates the location of the STA 5.

This configuration enables the estimation of the arrival direction with high accuracy even in a case where each AP and the STA 5 are performing the directivity control in the millimeter wave communication network, thereby making it possible to improve the accuracy in location estimation of the STA 5.

Further, the ARC 4 can estimate the arrival direction using the reception qualities calculated during the beam-forming training between the AP and the STA 5. Accordingly, there is no need to perform a reception quality calculation process for estimating the arrival direction, separately from the beam-forming training. This enables the simplification of the location estimation process.

Further, the array antenna of each AP changes its direction in a two-dimensional plane ($X_L$-$Z_L$ plane of FIG. 3) of the local coordinate system. Accordingly, the estimated arrival direction is also an arrival direction in the two-dimensional plane. According to the present embodiment, the ARC 4 transforms the estimated arrival direction from the local coordinate system to the world coordinate system, and estimates the location of the STA 5 from the transformed arrival directions and the locations of respective APs in the world coordinate system. This enables the estimation of the location of the STA 5 even in a case where the estimated arrival direction is an arrival direction in the two-dimensional plane.

In the embodiment described above, it is described that the control unit 43 of the ARC 4 performs the arrival direction estimation process. However, the present disclosure is not limited thereto. Alternatively, the arrival direction estimation process may be performed by the control unit of each AP. In that case, the storage unit of each AP stores characteristics of the array antenna (for example, radiation pattern vector). Further, the control unit of the AP transmits the estimated arrival direction (for example, arrival direction vector AoA) to the APC 4 via the external I/F unit.

In the embodiment described above, the configuration is described using an example in which the APC 4 and the APs are included in the wireless communication system as separate devices. However, the present disclosure is not limited thereto. Alternatively, at least one of the APs may have the function of the APC.

Figure 6:
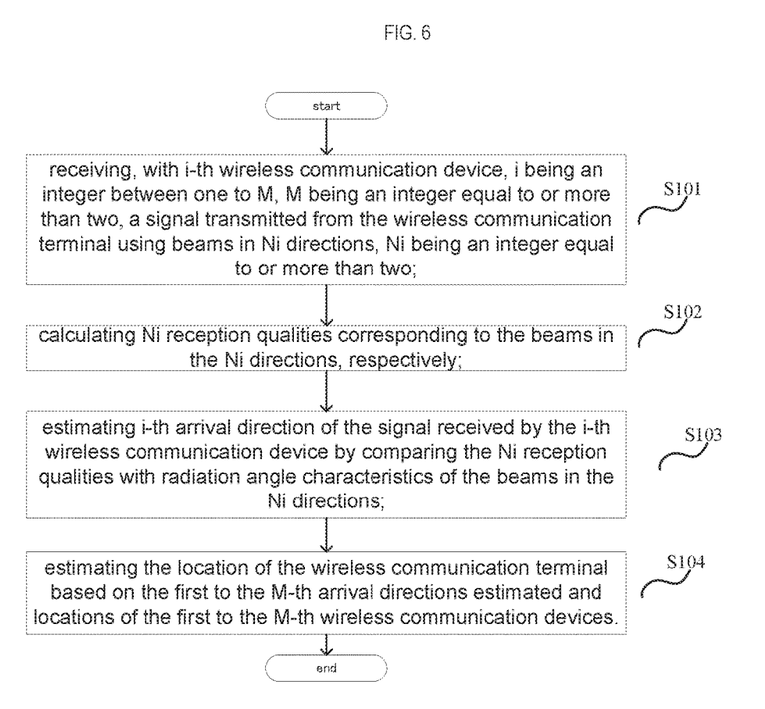
FIG. 6 is a flowchart illustrating an example of a location estimation method according to an embodiment in this disclosure.

FIG. 6 is a flowchart illustrating an example of a location estimation method according to the present embodiment. In FIG. 6, the location estimation method is for estimating a location of the wireless communication terminal in the system including at least first to M-th wireless communication devices, where M is an integer equal to or more than two. At S101, an i-th wireless communication device, i being an integer between one to M, receives a signal transmitted from the wireless communication terminal using beams in Ni directions, where Ni is an integer equal to or more than two. At S102, Ni reception qualities corresponding to the beams in the Ni directions, respectively, are calculated. At S103, an i-th arrival direction of the signal received by the i-th wireless communication device is estimated by comparing the Ni reception qualities with radiation angle characteristics of the beams in the Ni directions. At S104, the location of the wireless communication terminal is estimated based on the first to the M-th arrival directions estimated and locations of the first to the M-th wireless communication devices.

Although various embodiments are described above with reference to the drawings, it goes without saying that the present disclosure is not limited to these examples. It is apparent that those skilled in the art may readily conceive various modifications and alterations within categories described in the scope of the claims, and it should be understood that those modifications and alterations obviously fall within the technical scope of the present disclosure as well. Further, without departing the sprit and scope of the present disclosure, components of the embodiments described above may arbitrarily combined.

In the embodiments described above, the present disclosure is described using examples implemented by hardware. However, the present disclosure may also be implemented by software in conjunction with hardware.

Functional blocks used for describing the foregoing embodiments are typically implemented as LSI, which is an integrated circuit including input terminals and output terminals. The integrated circuit may control each of the functional blocks used for describing the foregoing embodiments and may include an input and an output. These may be configured as individual chips, or a single chip may be configured in such a manner to include part or all of them. Here, it is referred to as LSI. However, depending on the degree of integration, it may also be referred to as IC, system LSI, super LSI, or ultra LSI.

A means for achieving the integrated circuit is not limited to an LSI. Alternatively, the integrated circuit may be achieved by use of a dedicated circuit or a general-purpose processor. After fabricating an LSI, a field programmable gate array (FPGA), which is programmable, or a reconfigurable processor, in which a connection or setup of a circuit cell inside the LSI can be reconfigured, may also be utilized.

Further, in a case where a technology of circuit integration that can replaces the LSI emerges because of another technology to be created by development of semiconductor technology or derived therefrom, integration of the functional blocks may obviously be carried out by such technology. There is a possibility that biotechnology and the like may become applicable.

Overview of the Present Disclosure

A location estimation system for estimating a location of a wireless communication terminal, the location estimation system including first to M-th wireless communication devices and a control device, M being an integer equal to or more than two, wherein i-th wireless communication device, i being an integer between 1 to M, includes communication circuitry, which in operation, receives a signal transmitted from the wireless communication terminal using beams in Ni directions, Ni being an integer equal to or more than two, and control circuitry, which in operation, calculates Ni reception qualities corresponding to the beams in the Ni directions, respectively, and wherein the control device includes storage circuitry, which in operation, stores radiation angle characteristics of the beams in the Ni directions for each of the first to M-th wireless communication devices and control circuitry, which in operation, estimates i-th arrival direction of the signal received by the i-th wireless communication device by comparing the Ni reception qualities obtained from the i-th wireless communication device with the radiation angle characteristics of the beams in the Ni directions, and estimates the location of the wireless communication terminal based on the first to the M-th arrival directions estimated and locations of the first to the M-th wireless communication devices.

In the location estimation system of the present disclosure, the control circuitry of the i-th wireless communication device communicates with the wireless communication terminal using the beam corresponding to a best reception quality among of the Ni reception qualities.

In the location estimation system of the present disclosure, the control circuitry of the control device estimates the i-th arrival direction by performing pattern matching between a reception quality vector and an arrival direction model, the reception quality vector representing the Ni reception qualities, the arrival direction model representing the radiation angle characteristics of the beams in the Ni directions.

In the location estimation system of the present disclosure, the control circuitry of the control device transforms a coordinate system used for estimating the i-th arrival direction to a coordinate system in which the location of the i-th wireless communication device is to be defined.

A location estimation method for estimating a location of a wireless communication terminal in a system including at least first to M-th wireless communication devices, M being an integer equal to or more than two, the location estimation method comprising: receiving, with i-th wireless communication device, i being an integer between one to M, a signal transmitted from the wireless communication terminal using beams in Ni directions, Ni being an integer equal to or more than two; calculating Ni reception qualities corresponding to the beams in the Ni directions, respectively; estimating i-th arrival direction of the signal received by the i-th wireless communication device by comparing the Ni reception qualities with radiation angle characteristics of the beams in the Ni directions; and estimating the location of the wireless communication terminal based on the first to the M-th arrival directions estimated and locations of the first to the M-th wireless communication devices.

A base station control device that is connected to first to M-th wireless communication devices, M being an integer equal to or more than two; and estimates a location of a wireless communication terminal, the base station control device comprising: an input-and-output terminal that receives input of Ni reception qualities corresponding to beams in Ni directions, respectively, Ni being an integer equal to or more than two, the Ni reception qualities being calculated by receiving a signal transmitted from the wireless communication terminal with i-th wireless communication device using the beams in the Ni directions, i being an integer between 1 to M; storage circuitry, which in operation, stores radiation angle characteristics of the beams in the Ni directions for each of the first to M-th wireless communication devices; and control circuitry, which in operation, estimates i-th arrival direction of the signal received by the i-th wireless communication device by comparing the Ni reception qualities obtained from the i-th wireless communication device with the radiation angle characteristics of the beams in the Ni directions, and estimates the location of the wireless communication terminal based on the first to the M-th arrival directions estimated and locations of the first to M-th wireless communication devices.

The present disclosure is useful in wireless communication systems.

What is claimed is:

1. A location estimation system for estimating a location of a wireless communication terminal, the location estimation system including first to M-th wireless communication devices and a control device, M being an integer equal to or more than two, wherein:
    each i-th wireless communication device, for all integers i between 1 to M, includes:
        communication circuitry, which in operation, receives a signal transmitted from the wireless communication terminal using beams in Ni directions, Ni being an integer equal to or more than two, and
        control circuitry, which in operation, calculates Ni reception qualities corresponding to the beams in the Ni directions, respectively, and wherein
    the control device includes:
        storage circuitry, which in operation, stores radiation angle characteristics of the beams in the Ni directions for each of the first to M-th wireless communication devices and
        control circuitry, which in operation, for all integers i between 1 and M: estimates an i-th arrival direction vector ai of the signal received by the i-th wireless communication device by comparing the Ni reception qualities obtained from the i-th wireless communication device with the radiation angle characteristics of the beams in the Ni directions, and determines, for all i of at least the first to M-th wireless communication devices:
            an orientation transformation matrix Mi corresponding to an orientation of an array antenna of the communication device,
            a vector ni=Mi ai, and
            a line Li that passes through a location of the i-th wireless communication device and is parallel to the vector ni;
        determines, for all pairs (i, j) of wireless communication devices with $1 \leq i \leq M$ and $1 \leq j \leq M$ a point Pi,j which is a closest point to the line Lj among points on the line Li, and
        estimates the location of the wireless communication terminal from the center of mass of all points Pi,j with $1 \leq i \leq M$ and $1 \leq j \leq M$.

2. The location estimation system according to claim 1, wherein
    the control circuitry of the i-th wireless communication device communicates with the wireless communication terminal using the beam corresponding to a best reception quality among of the Ni reception qualities.

3. The location estimation system according to claim 1, wherein
    the control circuitry of the control device estimates the i-th arrival direction by performing pattern matching between a reception quality vector and an arrival direction model, the reception quality vector representing the Ni reception qualities, the arrival direction model representing the radiation angle characteristics of the beams in the Ni directions.

4. The location estimation system according to claim 1, wherein
    the control circuitry of the control device transforms a coordinate system used for estimating the i-th arrival direction to a coordinate system in which the location of the i-th wireless communication device is to be defined.

5. A location estimation method for estimating a location of a wireless communication terminal in a system including at least first to M-th wireless communication devices, M being an integer equal to or more than two, the location estimation method comprising:
    receiving, for all i with $1 \leq i \leq M$, with the i-th wireless communication device, a signal transmitted from the wireless communication terminal using beams in Ni directions, Ni being an integer equal to or more than two;
    calculating Ni reception qualities corresponding to the beams in the Ni directions, respectively;
    estimating, for all i with $1 \leq i \leq M$, an i-th arrival direction vector ai of the signal received by the i-th wireless communication device by comparing the Ni reception qualities with radiation angle characteristics of the beams in the Ni directions;
    determining, for all i of at least first to M-th wireless communication devices:
        an orientation transformation matrix Mi corresponding to an orientation of an array antenna of the communication device,
        a vector ni=Mi ai,
        a line Li which is the line that passes through a location of the i-th wireless communication device and is parallel to the vector ni;

determining, for all pairs (i,j) of wireless communication devices with 1≤i≤M and 1≤j≤M a point Pi,j which is the closest point to the line Lj among points on the line Li, and estimating the location of the wireless communication terminal from a center of mass of all points Pi,j with 1≤i≤M and 1≤j≤M.

6. A base station control device that is connected to first to M-th wireless communication devices, M being an integer equal to or more than two, and estimates a location of a wireless communication terminal, the base station control device comprising:

an input-and-output terminal that receives input of Ni reception qualities corresponding to beams in Ni directions, respectively, Ni being an integer equal to or more than two, the Ni reception qualities being calculated by receiving a signal transmitted from the wireless communication terminal with i-th wireless communication device using the beams in the Ni directions, i being an integer between 1 to M;

storage circuitry, which in operation, stores radiation angle characteristics of the beams in the Ni directions for each of the first to M-th wireless communication devices; and control circuitry, which in operation:

estimates i-th arrival direction vector ai of the signal received by the i-th wireless communication device by comparing the Ni reception qualities obtained from the i-th wireless communication device with the radiation angle characteristics of the beams in the Ni directions, determines, for all i of at least first to M-th wireless communication devices:

an orientation transformation matrix Mi corresponding to an orientation of an array antenna of the communication device, a vector ni=Mi ai, and a line Li that passes through a location of the i-th wireless communication device and is parallel to the vector ni, determines, for all pairs (i,j) of wireless communication devices APi, APj with 1≤i≤M and 1≤j≤M a point Pi,j which is the closest point to the line Lj among points on the line Li, and estimates the location of the wireless communication terminal from a center of mass of all points Pi,j with 1≤i≤M and 1≤j≤M.

* * * * *